Aug. 23, 1938.    M. BARUCH ET AL    2,127,581
AIR CONDITIONING APPARATUS
Filed Aug. 8, 1935    2 Sheets-Sheet 2
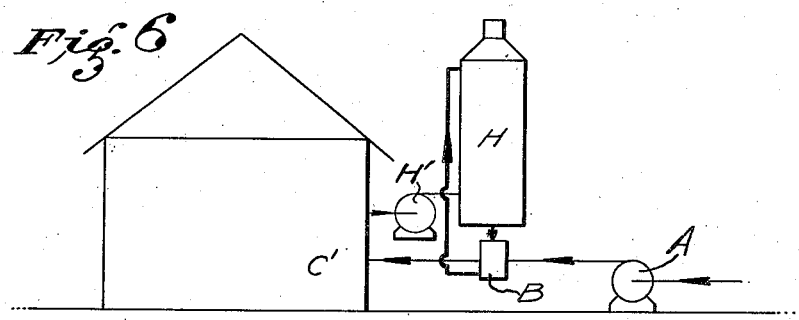
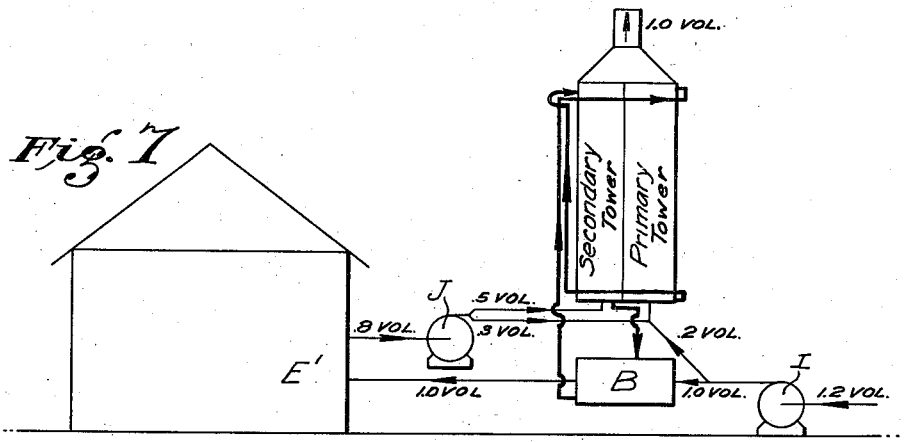
INVENTORS
MILTON BARUCH
RALPH E. PHILLIPS
BY Arthur A. Knight &
Alfred W. Knight
ATTORNEYS.

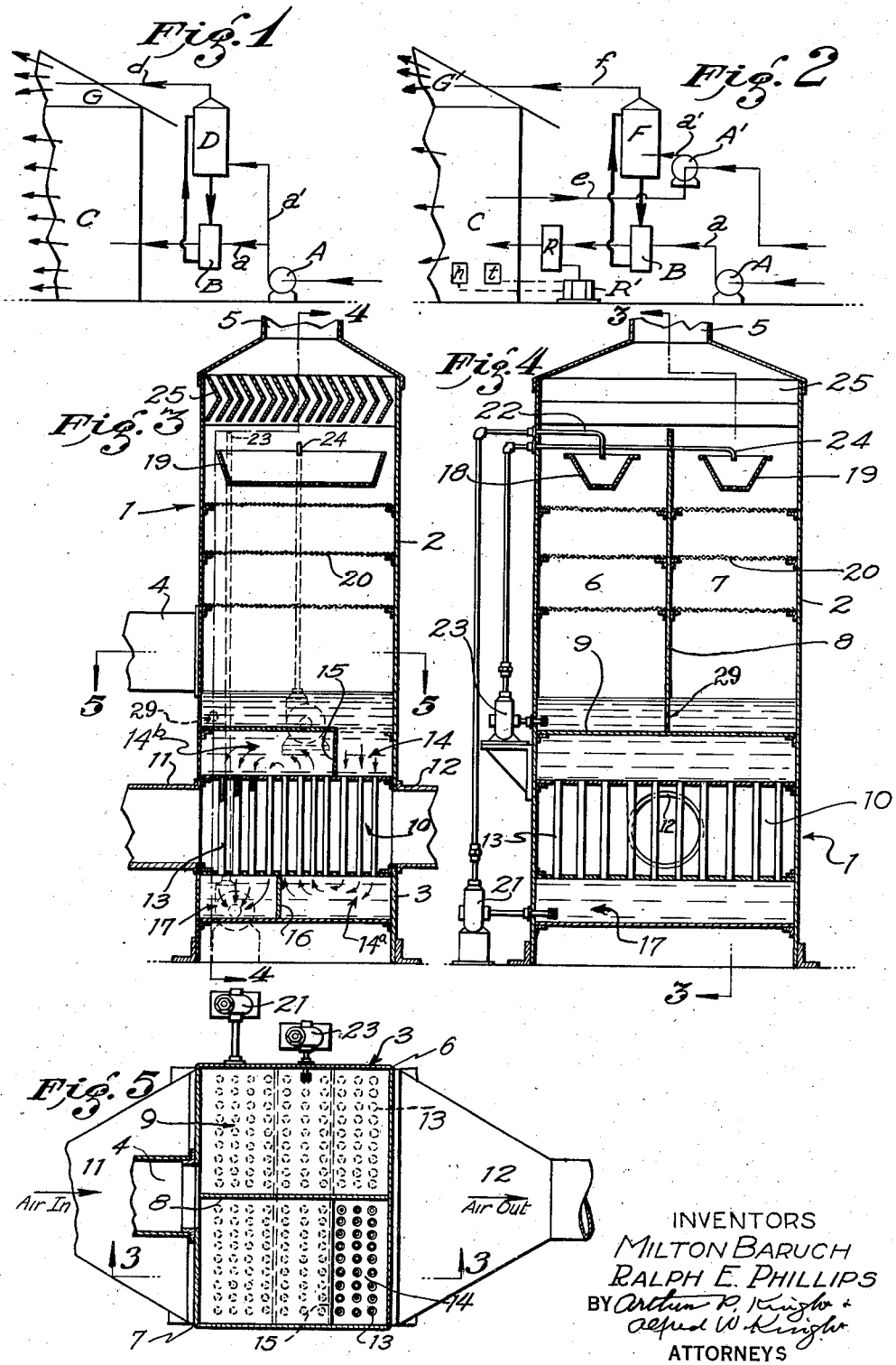

Patented Aug. 23, 1938

2,127,581

UNITED STATES PATENT OFFICE 2,127,581

AIR CONDITIONING APPARATUS

Milton Baruch, Los Angeles, and Ralph E. Phillips, Viewpark, Calif.

Application August 8, 1936, Serial No. 95,004

3 Claims. (Cl. 62—139)

This invention relates to air-conditioning systems and pertains particularly to the provision of means for securing a "single pass" circulating system as contrasted to the "re-circulating" systems conventionally employed in this art.

The common practice in air-conditioning treatments is to provide positive circulation of a volume of air thru the space under treatment, continuously withdrawing a portion of such air and replenishing the volume with a corresponding quantity of fresh air while maintaining the volume of air under circulation at a desired temperature and relative humidity. One of the principal reasons for employing a system of this character resides in the energy economies obtainable thereby in that it is only necessary to extract that proportion of heat and moisture from the air withdrawn from the space under treatment which is represented by the heat and moisture disseminating agents within such space, and to compensate for the heat and moisture of the added fresh air. Such recirculating systems are relatively expensive of installation and operation, and do not provide any method of replenishing the oxygen content of the air withdrawn from the space under treatment and recirculated into the space. In addition, these systems ordinarily do not have a satisfactory method of removing odors, smoke, or other objectionable contaminants in the air.

In view of the above, one of the particular objects of the present invention is to provide an apparatus adapted for continuous supply of conditioned fresh air to a space under treatment, while maintaining the energy consumption of the system at a desired low level.

A further object of the invention is to provide an apparatus adapted to supply a volume of cooled and conditioned air to a space under treatment and to utilize this volume of air after passing the same thru said space in a heat exchange treatment of the air supplied to such space.

Another object of the invention is to provide an air-conditioning system which may utilize the once cooled and contaminated air exhausted from a dwelling or other space under treatment for the purpose of cooling the incoming air in the absence of direct contact between the exhausted and incoming air, whereby contamination of said incoming air is avoided.

A further object of the invention is to provide an advantageous type of evaporation cooler which will afford a maximum cooling effect in a minimum space.

Another object of the invention is to provide an air-conditioning system including a cooling means of the water evaporation type in association with an auxiliary refrigerating means arranged to provide dehumidification and/or additional cooling of the volume of air under treatment in such manner that the auxiliary refrigerating means operates only when the moisture content of the air in the space to be treated is such that a dehumidification or additional cooling is required, whereby the major portion of the cooling effect is obtained by the first-mentioned cooling means and the auxiliary refrigerating means operates only under abnormal conditions. This apparatus arrangement provides for the energy economies of a cooling means of the water-evaporation type under all normal operating conditions and also provides the benefits of a dehumidifying type of apparatus under abnormal conditions, together with an economy of installation which may not be attained with the conventional refrigerating type of air-conditioning unit.

According to the present invention, in a simple embodiment, atmospheric air is passed through a suitable heat exchange means whereby such air is reduced in temperature and increased in relative humidity without increasing its absolute humidity. The cooled air is then introduced into a dwelling or other space to be conditioned either with or without further refrigeration. This air may then be withdrawn from the dwelling and passed through an evaporation type cooler for the purpose of cooling a body of water or other suitable heat transfer agent which is circulated through the heat exchange device through which the volume of air is passed as above described in non-contacting relation with the heat transfer agent circulated in said heat exchange device. Passage of the exhaust air through the evaporation cooler will cause a relatively large increase in relative humidity thereof, and while this air is still cool, its relatively high humidity will make it unsuited for introduction into a dwelling space, and for this reason we preferably pass the air from the evaporation cooler into the attic or other wall space of a building to provide an insulating blanket of cool air.

The apparatus of the present invention may comprise, essentially, a system of ducts and air-supply means such as blowers, in association with a cooling means which preferably includes a heat-exchange means adapted to effect a chilling of a body of air passed therethrough without increase in the absolute moisture content thereof, and an evaporation type cooler of a preferred construction adapted to receive air exhausted from the space under treatment and employ the same in an evaporation treatment of a body of water or fluid which is circulated through the first-mentioned heat exchange means in a non-contacting relation with the air passing therethrough.

Other objects and advantages of the present invention will be more fully brought out in the following specific description thereof, or will be apparent therefrom. In the accompanying drawings we illustrate a preferred type of cooling means and the method of use thereof, and referring thereto:

Fig. 1 is a flow sheet of a simple example of the practice of the present invention;

Fig. 2 is a flow sheet of a more involved practice of the present invention, in which a high energy efficiency may be maintained;

Fig. 3 is a sectional side elevation of an evaporation cooler according to the present invention, taken on line 3—3 in Fig. 4;

Fig. 4 is a sectional front elevation thereof taken on line 4—4 in Fig. 3;

Fig. 5 is a sectional plan view thereof taken on line 5—5 in Fig. 3;

Fig. 6 is a flow sheet of a further example of the practice of the present invention;

Fig. 7 is a flow sheet of a somewhat more involved procedure which may be carried out with the apparatus of the present invention.

In Fig. 1 we have shown a blower or the like A, adapted to receive air from the atmosphere and discharge the same through two branch conduits $a$ and $a'$. The branch conduit $a$ passes through a heat exchange cooler B and thence into the space C to be cooled, such as a dwelling or the like. The branch conduit $a'$ connects with an evaporation type cooler D and a conduit $d$ is provided between the cooler D and an attic space or the like G. According to this practice of the invention, the body of air divided into two portions, one of which portions is passed through the cooler B and introduced directly into the dwelling, from whence it is dissipated to the atmosphere through certain openings such as an open window or the like and the other portion of the air is passed into the evaporation tower to cool a body of water which is employed in a heat-exchanging, non-contacting, relation with the air passed through the cooler B. The relatively cool air passing from cooler D is introduced through the conduit $d$ into the attic space G, or other wall portion, and serves to provide an insulating blanket at the roof or other wall portion of the house, and materially contributes to the cooling effect of the system as a whole.

The cool air supplied through B into the space C will escape from said space through the normal openings in the building, such as windows and doors, or specific openings may be provided in the space for the escape of such air. The air supplied to the attic G through the duct $d$ will escape through the conventional ventilating louvers or the like provided in attic spaces, preferably at points removed from the inlet of the duct $d$. The escape of air from the spaces C and G is indicated diagrammatically by arrows.

Fig. 2 illustrates an arrangement which provides for the introduction of a cooled volume of air to a space undergoing treatment, the withdrawal of cooled air from such space and the passage thereof through an evaporation type cooler as above described, together with additional atmospheric air. Referring to this arrangement, a blower is shown at A provided with a discharge duct $a$ leading into a heat exchanger B and thence through a refrigerator R and thence into the space C to be subjected to treatment. The refrigerator R is provided with a suitable power unit indicated at R'. Air is withdrawn from the space C through a duct $e$ to the inlet side of a second blower A', the inlet side of which also communicates with the atmosphere so that the air discharged therefrom constitutes all of the air withdrawn from the space C plus an additional quantity of atmospheric air. The discharge from the blower A' passes through a duct $a'$ into an evaporation tower F and is then preferably discharged to the attic space G' or the like through a duct $f$, as described in connection with Fig. 1. Within the cooling tower F a body of water or other cooling agent is cooled by the action of the air supplied to said tower and this water is passed in heat-exchanging relation to the incoming air within the heat-exchanger B and recirculated to the tower F for further cooling.

It will be appreciated that the refrigerator R is adapted to function both as chilling agent whereby the temperature of the air from the cooler B is reduced to a desired low level, and as a dehumidifier. The dehumidifying action is obtained when the air from the cooler B is cooled at R to a temperature below the dew point. If the atmospheric conditions are in general such that additional cooling is not required, a dehumidifying agent of some other form may be substituted for the refrigerator. For example, we may use a body of absorbent material such as silica-gel or the like. It will further be appreciated that the refrigerator or dehumidifying unit is not generally required to be operated all the time, inasmuch as the cooler B will be able to maintain the desired low temperature in the space C except under the most adverse conditions. For this reason, we preferably provide a suitable form of humidostat and thermostat within the space C, such as shown at $h$ and $t$, which may be employed to control the power supply R' for the refrigerator R according to methods well known in the art. According to this arrangement, in the event that the temperature in the space C rises to a point above that desired, the thermostat $t$ will start operation of the power plant R' and the refrigerator R will then go into operation and will further cool the air from the cooler B until the desired lowered temperature is reached in the space C. Alternatively, if the humidity of the air within the space C reaches a value above that desired, the humidostat $h$ will operate to start the refrigerator R and secure the desired dehumidifying effect. In the event that some other form of dehumudifying means is employed in place of the refrigerator R, it will be apparent that the humidostat $h$ may be employed to effect a control of the circulation of the airflow through the dehumidifying means.

In view of the fact that the space C will not be absolutely air tight, the volume of air withdrawn through the duct $e$ will not be equal to that supplied to the space C. In general, however, we find it feasible to remove approximately 80 per cent of the air supplied to a space under treatment, and under such circumstances, only about 20 per cent of makeup air is required at the blower A'. The proportion of air which is lost from the space C is indicated by the small arrows at the left side of the figure. As in the case shown in Fig. 1, the air supplied from the tower F through the duct $f$ into the space G' will escape from such space through the conventional openings therein as indicated by the heavy arrows.

Referring to Figs. 3 through 5, the cooling device of the present invention may comprise a vertical tower or casing 1 divided into upper and lower portions 2 and 3. The upper portion 2 comprises a water-cooling space or evaporation tower provided with air inlet means such as a duct 4 adjacent the lower end thereof and an exhaust duct 5 adjacent the upper end thereof. The tower 2 is preferably divided into two separate evaporation zones or portions 6 and 7 through the agency of a medial partition 8 extending vertically throughout the major portion of the tower in the direction of inlet of air through the duct 4. The two portions 6 and 7 will be hereinafter designated as primary and secondary evaporating towers, respectively. The primary tower 6 is provided with a lower wall 9 which provides a space at the lower portion of said tower for the accumulation of water, as will be hereinafter described.

The lower portion 3 of the device constitutes an air-cooling or heat exchange portion and may comprise an air duct 10 provided with an air inlet duct 11 and an exhaust duct 12 at opposite sides thereof, and heat exchange means such as a plurality of water tubes 13 extending transversely and preferably vertically across the duct 10. A circulation of water is provided through the tubes 13 from the lower end of the tower 7, the water preferably being withdrawn from said tower 7 through a passage 14 into that group of tubes adjacent the exhaust duct 12 and then into a header space 14a below said group of tubes. The water is then circulated upwardly through the group of tubes intermediate the inlet and exhaust ducts 11 and 12. After passing through the aforesaid intermediate group of tubes the water may be caused to enter a header space 14b, which may be partitioned from the passage 14 by means of a partition 15, and is then passed through that group of tubes adjacent the inlet duct 11 into a discharge space 17, the space 17 being separated from the header 14b by a partition 16. The circulating water may then be withdrawn from the space 17 and introduced into the tower portion 2 as hereinafter described.

Duct 4 opens into both of the chambers 6 and 7 as shown in Fig. 5 so that a substantially equal distribution of air is provided for the two towers 6 and 7 in the portion 2 of the device, and water spray means such as perforated distributing baskets or troughs 18 and 19 are provided adjacent the upper end of the respective towers, suitable water supply means being provided to said troughs in such manner as to effect a withdrawal of water which has passed through the heat exchange means 3 and introduce the same into the primary tower 6 to cause a partial cooling thereof, and subsequently withdraw the water from the tower and introduce the same into the secondary tower 7, from whence it recirculates through the heat exchanger 3, being introduced to said heat exchanger through the portion 14 aforesaid. Suitable screen members are preferably provided in the towers 6 and 7, as at 20, to assist in promoting contact between the water and air in said towers. The water-circulating system may comprise a pump 21 communicating with the portion 17 of the heat exchanger 3 and adapted to withdraw water therefrom and introduce the same into the trough 18 in the tower 6 through the agency of a supply line 22. At a point adjacent the lower end of the tower 6, as defined by the partition 9, we provide a second pump 23 adapted to withdraw water from the lower portion of said tower 6 and introduce the same into the trough 19 in the secondary tower 7 through the agency of a suitable supply line 24. Suitable means may be provided to supply water to the system to make up for water lost by evaporation. It may be convenient, for example, to supply water automatically from the water supply mains by employing a float valve in the primary tower 6 which is operable to maintain a fixed water level above the partition 9. Due to the fact that the pumps 21 and 23 may not maintain a uniform water level in the primary and secondary cooling towers, there may be a tendency for one or the other of the towers to load up with water so that an incorrect amount of makeup water will be supplied to the system. In order to obviate such a condition we find it advantageous to provide an equalizer opening 29 in the partition 8 as shown in Figs. 3 and 4 to provide for an equalizing flow of water between the water bodies in the primary and secondary towers. Suitable baffle means or deflectors are preferably provided above the water-distributing means 18 and 19, as shown at 25, for the purpose of extracting any large particles of water which may be sprayed upwardly from the towers due to the flow of air from the duct 4 to the duct 5.

The cooling device of the present disclosure may be employed in connection with either of the above-described arrangements of apparatus elements shown in Figs. 1 and 2. As a specific example, the cooling device may be employed in the relation shown at B and D in Fig. 1, in which a blower A is arranged to supply approximately equal volumes of air to the ducts 11 and 4 (corresponding to the ducts $a$ and $a'$ in Fig. 1), and the exhaust duct 12 of the heat exchanger 3 is caused to communicate directly into the space C to be cooled, while the exhaust duct 5 of the evaporating tower 2 is caused to communicate with the attic or other wall space G or G'. The blower A is caused to pump air from the atmosphere into the respective upper and lower portions of the cooling tower, and during the passage of air through duct 10 in the portion 3 of the tower it will be chilled to a temperature closely approximating that produced in the water which has passed through both the primary and secondary evaporating tower portions (providing the heat exchange area of the tubes 13 is adequate with respect to the volume of air passed through the duct 10) and is increased in relative humidity, but in view of the fact that the air does not come in actual contact with the water, the absolute humidity thereof remains unchanged unless the dew point of the atmospheric air is above the temperature. The air supplied at 4 to the towers 6 and 7 will effect a cooling of the water discharged from the troughs 18 and 19, the water withdrawn by the pump 23 from the tower 6 being partly reduced in temperature and the water withdrawn from the tower 7 and introduced into the heat exchange means 3 being cooled to a temperature only slightly above the wet-bulb temperature of the air entering at duct 4.

As a specific example, assuming the atmospheric air to have a dry-bulb temperature of 95° and a wet-bulb temperature of 71° and assuming that 5500 cubic feet per minute of fresh air is to be supplied to the space under treatment, in accordance with the flow sheet shown in Fig. 1, the apparatus proportions, and the conditions obtained, will be as follows:

The blower A will have a capacity of about 11,000 cubic feet per minute and the atmospheric air discharged from this blower will be divided approximately equally between the cooler B and the evaporating tower D. The air passed through the tower D will cool the water to a temperature in the neighborhood of 76° F., which water when circulated through the cooler B will serve to cool the 5500 cubic feet per minute introduced to said cooler to a dry-bulb temperature of approximately 79° F. and a wet-bulb temperature of approximately 66° F. The space C under treatment may thus be maintained at a relatively low temperature, the air therein having a dry-bulb temperature approximating 84° F. and a wet-bulb temperature approximating 68° F. Under these conditions, the tower D will be required to evaporate approximately 12 gallons of water per hour, and the only power consumption for the entire apparatus is at the blower A and the water pumps which circulate the cool water between the tower D and the cooler B. (Hereinafter, it will be understood that the temperatures given are according to the Fahrenheit scale).

It will be appreciated that the air supplied to the attic G from the cooling tower D will assist in cutting down the heat transfer between the roof and the space C. The above example shows a dry-bulb temperature rise of about 5° within the space under treatment, and in general we prefer to so balance the capacity of the air conditioning unit to the heat-gain in the space under treatment that a temperature rise greater than this figure is not obtained.

Where an apparatus arrangement such as shown in Fig. 2 is employed, the blower A will preferably have a capacity of 5500 cubic feet per minute, assuming the space under treatment to be equivalent to the space C shown in Fig. 1, and the blower A' will preferably also have a capacity of about 5500 cubic feet per minute. The volume of air passed through the cooler B and introduced into the space C cannot be wholly returned through the duct e into the blower A' due to loss of a portion of the air into the atmosphere through various openings in the space C, as above pointed out, and blower A' is thus caused to draw in some additional atmospheric air. Approximately 80% of the air supplied to the space C may be withdrawn at the duct e, namely, in this instance, approximately 4,400 cubic feet, and approximately 1,100 cubic feet of atmospheric air is taken in at the blower A'. In view of the fact that the air withdrawn from the space C through the duct e is considerably cooler than the atmospheric air and has a lower wet-bulb temperature, it is possible in this arrangement of apparatus to secure a lower temperature in the water delivered from the tower F than from the tower D in the flow sheet shown in Fig. 1. This feature makes possible the use of a smaller cooler at B for the same operating conditions, and divides the air supply means into two separate blowers of smaller capacity. These blowers may obviously be operated from a single motor in order to simplify the installation, as will be apparent to one skilled in the art.

In the event that the relative humidity of the atmospheric air is too high to permit the entire cooling to be carried out in the absence of dehumidification of the air, we preferably employ the refrigerator R to subject the air delivered from the cooler B to a further refrigeration and/or dehumidification by actual removal of moisture therefrom before introducing the air into the space C.

A typical set of operating conditions which may be obtained according to the showing in Fig. 2 may be given as follows:

Assuming the atmospheric air to be at a dry-bulb temperature of 95° and a wet-bulb temperature of 71°, the dew point being 59°, the cooler B may be employed to cool the 5500 cubic feet per minute of air to a dry-bulb temperature of approximately 74° and a wet-bulb temperature of 64°. The refrigerator R may be employed to further chill the air to, for example, a temperature of 56° both wet and dry-bulb, thus reducing the dew point to 56°. The air is thus introduced into the space C in substantially saturated condition, but due to the relatively low temperature, the air is still within the "comfort zone" condition. The air will be raised to a temperature of, for example, 78° dry-bulb and 65° wet-bulb within the space C and the air withdrawn through the duct e and introduced through the tower F by means of the blower A' together with some additional atmospheric air, as above pointed out, will have a resultant wet-bulb temperature in the neighborhood of 67°. Air at this temperature may be employed to cool the water within the tower to a temperature in the neighborhood of 70°. Under the above conditions, approximately 14 gallons of water will be evaporated per hour within the tower F, and approximately 10 H. P. will be required at the refrigerator R to reduce the temperature of the air to the value given. This horsepower consumption, together with the horsepower consumption of the blowers A and A' and the circulating pumps, amounts to less than 14½ horsepower under the most severe operating conditions, which is comparatively low for an air-conditioning unit of this capacity.

The actual amount of work accomplished in the above cooling procedure is equivalent to approximately 21 tons of ordinary refrigeration. If mechanical refrigeration were depended upon to secure the entire cooling action, approximately 26 horsepower would be required under the severe operating conditions illustrated, including the power required for circulation. Even in the case where 80 per cent of the air is recirculated and 20 per cent of fresh air brought in constantly, if mechanical refrigeration were depended upon to obtain the cooling capacity represented by the above figures, approximately 19 horsepower would be required for steady operation. The power economies of the present arrangement even under conditions where auxiliary cooling or dehumidification is required, are thus apparent. Under normal circumstances, that is, when the refrigerator R is not required to operate, the present apparatus consumes only about 4½ horsepower for the above set of conditions.

The present apparatus thus provides a highly advantageous arrangement of elements to obtain an economical air-conditioning treatment of a given space. With humidistats and/or thermostats as above set forth, in direct control of the refrigerator R, the apparatus will not be operating at its full power consumption at all times, although the desired temperature conditions will be continuously maintained within the space under treatment. In this particular example, the cooling power of the refrigerator R is approximately 10 tons, making an inexpensive installation of low first cost as compared with a unit which depends upon mechanical refrigeration to effect the entire cooling.

The arrangement shown in Fig. 6 is somewhat more efficient than the arrangement shown in Fig. 1 in that air of a lower wet-bulb temperature is passed through the cooling tower. According to this arrangement of apparatus, air may be passed from a blower A through a cooler B and introduced into a space C' and then withdrawn from said space through a blower H' and introduced into the evaporating tower H. This arrangement of apparatus is installed at a lower cost than that shown in Fig. 2 and is only slightly more expensive of installation than the apparatus shown in Fig. 1. It will be appreciated that the cool air exhausted from the top of the tower H may be employed to cool an attic or other wall space adjacent the space under treatment, as above described.

In Fig. 7 we have shown a somewhat further modified arrangement of apparatus elements in which the primary and secondary towers 6 and 7 as shown in Figs. 3, 4 and 5 are divided into separate elements, each provided with a separate inlet duct. According to this embodiment a blower I may take as an example, 1.2 volumes of air from the atmosphere and pass one volume through the cooler B and into the space E', and a second blower J removes 0.8 volume of air from the space E', which air is divided into two unequal portions and passed through the primary and secondary towers. In this particular arrangement, the air from the space E' is divided into a portion comprising 0.5 volume and a portion comprising 0.3 volume. The 0.5 volume is passed through the secondary tower and the 0.3 volume of air is passed into the primary tower together with 0.2 volume of atmospheric air realized from the blower I. This arrangement provides for obtaining the minimum temperature in the water supplied to the cooler B, inasmuch as the air withdrawn from the space E' and supplied to the secondary tower is at a lower wet-bulb temperature than the mixture supplied to the primary tower, thereby increasing the cooling effect which may be obtained with a given size of evaporation tower, it being realized that the ultimate temperature to which the water in the tower may be lowered is dependent entirely upon the wet-bulb temperature of the air employed for evaporation.

It will be appreciated that numerous modifications may be made in the form and arrangement of apparatus herein shown, without departing from the contemplation of this invention. For example, the cool moist air withdrawn from the evaporating tower shown at D, F, H, and the like, may be advantageously passed into a wall space other than the attic space as specifically shown in Figs. 1 and 2. Similarly, this cool air may be advantageously passed in heat-exchanging relation to the atmospheric air which is passed into the cooler D, so that the work requirements of said cooler are diminished thereby, or where a refrigerator unit is used such as shown in Fig. 2, this cool air may be passed in cooling relation to the power plant R' or to the refrigerant cooling coils associated therewith, as will be apparent to one skilled in the art.

Reference is made to our divisional application Ser. No. 183,316, filed January 4, 1938, in which we have described and claimed the method of air conditioning disclosed herein.

We claim:
1. A cooling unit for an air-conditioning system, which comprises: a vertically extending casing member having an upper and lower portion; a medial partition extending vertically upwardly through the major portion of said upper casing portion and defining primary and secondary evaporating towers, said casing being provided with air inlet means adjacent the lower end of said upper portion and communicating with said primary and secondary evaporating towers; liquid distributing means in the upper end of each of said evaporating towers; means defining an air passage extending through the lower portion of said casing; liquid-cooled heat-exchange means in said passage; means for withdrawing liquid from said heat-exchange means and introducing the same at said liquid distributing means in said primary tower; circulating means for withdrawing liquid from said primary tower and introducing the same at said liquid distributing means in said secondary tower; means for withdrawing liquid from said secondary tower and supplying the same to said heat-exchange means; and means for passing air upwardly through said primary and secondary towers to evaporate and cool the liquid supplied by said liquid distributing means.

2. A cooling unit for an air-conditioning system, which comprises: a casing having an upper and a lower portion; a medial partition extending vertically upwardly through the major portion of the length of said upper portion and defining primary and secondary evaporating towers; water spray means in the upper ends of said of said evaporating towers; a heat-interchanging device in said lower portion provided with an air passage means and a plurality of vertically extending water tubes extending transversely through said air passage and communicating with said secondary evaporating tower; means for passing air to be cooled through said passage means in heat interchanging contact with said water tubes; pump means for removing water from said heat-interchanging device and discharging said water into the water spray means in said primary evaporating tower; partition means at the lower end of said primary tower for accumulating water discharged from said water spray in said primary tower; pump means for removing the so accumulated water from said primary tower and discharging said water into the spray means in said secondary tower; and means for passing air upwardly through each of said towers to evaporate and cool the water supplied by said spray means.

3. The cooling unit set forth in claim 2, said heat-interchanging device being provided with partition means dividing said water tubes into a plurality of groups spaced longitudinally within said passage, the group of water tubes adjacent the outlet end of said air passage being in direct communication with said secondary tower and said first-named pump means communicating with a group of water tubes adjacent the inlet end of said passage.

MILTON BARUCH.
RALPH E. PHILLIPS.